United States Patent
Siemers

(10) Patent No.: US 7,509,479 B2
(45) Date of Patent: Mar. 24, 2009

(54) RECONFIGURABLE GLOBAL CELLULAR AUTOMATON WITH RAM BLOCKS COUPLED TO INPUT AND OUTPUT FEEDBACK CROSSBAR SWITCHES RECEIVING CLOCK COUNTER VALUE FROM SEQUENCE CONTROL UNIT

(75) Inventor: Christian Siemers, Wolfsburg (DE)

(73) Assignee: Siemens Aktiengesellschaft, Munich (DE)

( * ) Notice: Subject to any disclaimer, the term of this patent is extended or adjusted under 35 U.S.C. 154(b) by 193 days.

(21) Appl. No.: 11/662,469

(22) PCT Filed: Sep. 8, 2005

(86) PCT No.: PCT/EP2005/054452

§ 371 (c)(1),
(2), (4) Date: Mar. 12, 2007

(87) PCT Pub. No.: WO2006/029986

PCT Pub. Date: Mar. 23, 2006

(65) Prior Publication Data

US 2007/0260805 A1    Nov. 8, 2007

(30) Foreign Application Priority Data

Sep. 16, 2004 (DE) .......................... 10 2004 044 976

(51) Int. Cl.
*G06F 13/00* (2006.01)
(52) U.S. Cl. .......................................... 712/15; 712/37
(58) Field of Classification Search ........................ None
See application file for complete search history.

(56) References Cited

U.S. PATENT DOCUMENTS

| 4,984,192 | A  | * | 1/1991 | Flynn | 711/104 |
| 7,028,281 | B1 | * | 4/2006 | Agrawal et al. | 716/12 |
| 7,352,205 | B2 | * | 4/2008 | Siemers et al. | 326/38 |
| 2005/0218929 | A1 | * | 10/2005 | Wang et al. | 326/41 |

OTHER PUBLICATIONS

Wiegand C et al:, "Definition of a Configurable Architecture for Imp[lementation of Global Cellular Automation", Lecture Notes in Computer Science, Springer Verlag, New York, NY, US, vol. 2981, Feb. 2004, pp. 140-155, XP002326434, ISSN: 0302-9743 The Whole Document.

* cited by examiner

*Primary Examiner*—Kenneth S Kim
(74) *Attorney, Agent, or Firm*—Young & Thompson

(57) ABSTRACT

The invention relates to a computer containing a RAM-based primary part (Ht) with a stucturable RAM unit (2). On the input side, a first crossbar switch (1) is located upstream of said unit and a second crossbar switch (3) is located downstream. Address signals (18, 13) can be supplied from the first crossbar switch (1) to the RAN unit (2) or the second crossbar switch (3). Output signals (10) can be fed back from the second crossbar switch to the first crossbar switch (1) and can be output. An additional control part (St) for a configurable job sequencing of the primary part (Ht) comprises a counter unit (4) that is synchronised with the first crossbar switch (1) to create counter reading signals (12) for the first and second crossbar switch (1 and 3). The computer is particularly suitable for integrating a global cellular automaton (GCA).

17 Claims, 7 Drawing Sheets

RECONFIGURABLE GLOBAL CELLULAR AUTOMATON WITH RAM BLOCKS COUPLED TO INPUT AND OUTPUT FEEDBACK CROSSBAR SWITCHES RECEIVING CLOCK COUNTER VALUE FROM SEQUENCE CONTROL UNIT

1) INTRODUCTION

The present invention relates to a computer with a reconfigurable architecture, in particular for parallel computing of algorithms, containing a RAM-based primary part comprising at least one crossbar switch and bus systems, plus means for sequential control.

2) PRIOR ART [WITH REFERENCE TO FIGS. 1 to 4]

2.1 Known Computer Models

The design and structures/architectures of computers are described in citation [7], for example (cf. in particular pages 174 to 181, 229 to 248, 376 to 384, 400 and 401 of this citation).

Figure 1:
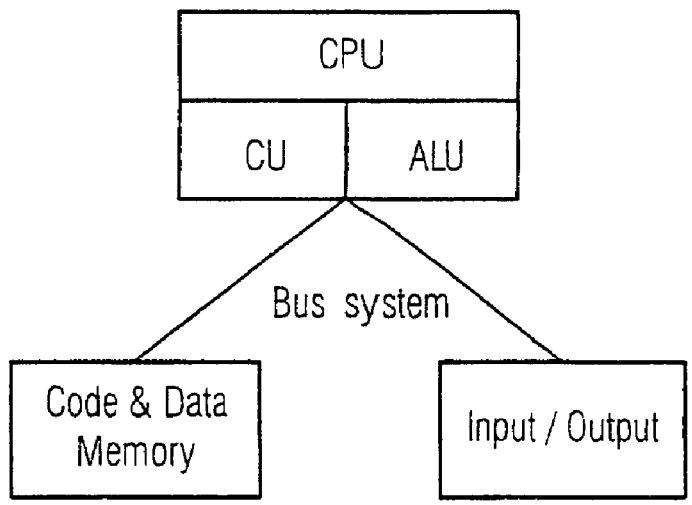

In general, the "Von-Neumann architecture", which is based on the structure shown in the block diagram of FIG. 1, is regarded as a universal computer. What is meant by this, is that in principle, all problems that can be expressed as an algorithm can be computed using a computer based on this architecture, comprising the components of central processing unit [CPU, which includes control unit (CU) and arithmetic logic unit (ALU)], memory, input/output and bus system. Such a computer addresses the given problem by means of a program i.e. a textual description of the algorithm e.g. in the programming languages C, C++ or Java. This program is converted into a machine-readable program by a compiler, which itself constitutes a program.

Program execution is always performed sequentially in the computers, which are based on the Von-Neumann architecture shown in FIG. 1 and similar architectures (e.g. a Harvard or modified Harvard architecture). This means that the algorithm, comprising a set of machine instructions, is processed by means of the first instruction being known. The instruction following an instruction is either the instruction held in the next address in the memory (normal program flow), or else the last instruction that was processed was a jump instruction, which shifts the current program status to another point. The internal register that stores the current program status is called the "program counter" (PC).

This principle of sequential processing means that exactly one instruction is being processed at a given moment in time. It is called the "Von-Neumann principle". Although modern architectures termed RISC (Reduced Instruction-Set Computing), superscalar or VLIW (Very Long Instruction Word) architectures do process more than one instruction at a time, the principle of sequentiality is retained. This processing principle is referred to in general as "time sequential" (computing in time), which indicates that the algorithm takes time.

Figure 2:
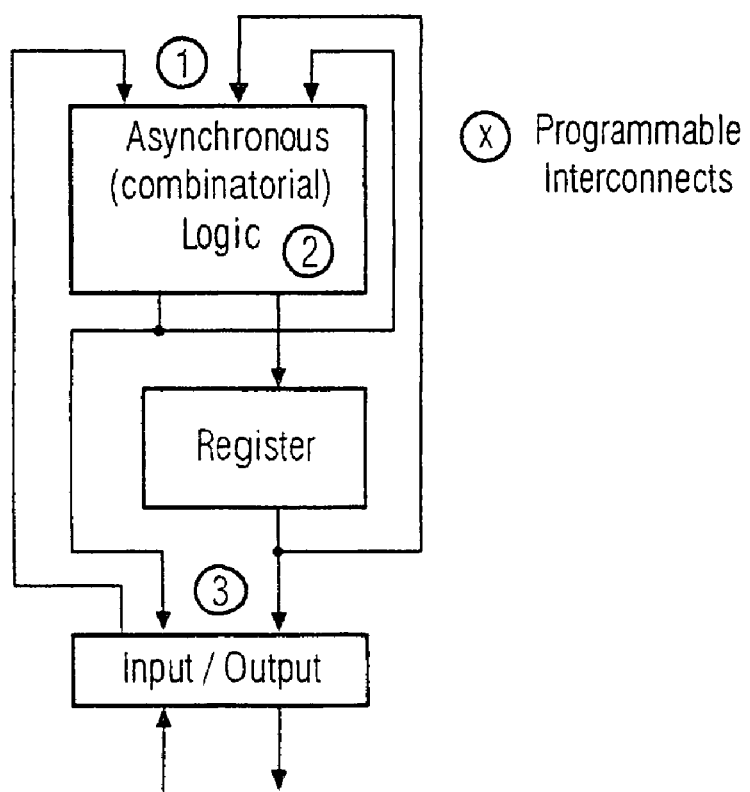
Figure 3:
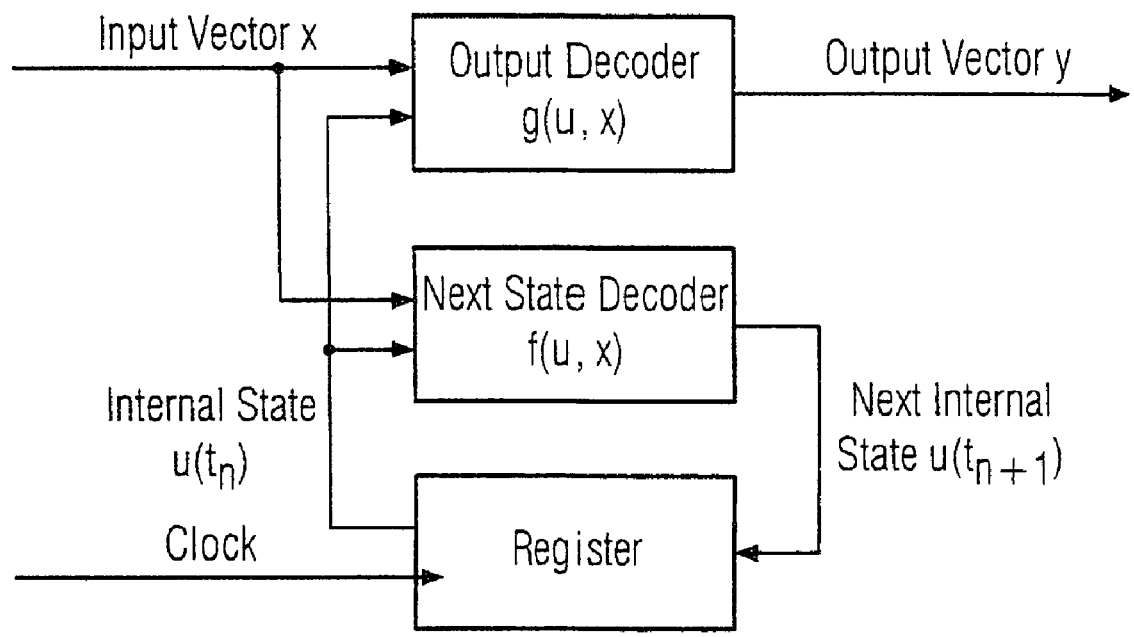

A quite different principle of program execution is provided in programmable logic devices [PLDs, as shown in FIG. 2] or in their best-known implementation, field programmable gate arrays [FPGAs]. This architecture is also universally applicable i.e. can be applied to any problem that can be expressed as an algorithm. In this case, programming is performed so that elemental processing units, usually defined at the bit level and hence called logic elements, are connected together in a network. This form of programming is usually referred to as "configuration".

Unlike the Von-Neumann principle, program execution in a PLD is performed with maximum parallelism. The whole configuration of a device can be regarded as a single instruction that is processed in full in one cycle, although unlike the Von-Neumann principle, not permanently defined, but configured. The cycle time, often linked to an external clock, then depends on the complexity of the configuration. This results in a lower clock rate being used compared to processors, but this is more than compensated for by the parallelism of the processing. This principle of execution is known as "computing in space".

2.2 Deterministic Finite Automata

One of the fundamental models for algorithmization of problems are deterministic finite automata [DFAs]. These are known in engineering as "Finite State Machines" (FSMs, as shown in the block diagram of FIG. 3). This model addresses the problem as a sequence of states linked by defined transition functions (next state decoders), that depend on the input values. Although the DFA model is theoretically not so powerful as the Von-Neumann model, in practice any problems can be solved, if need be by making an addition to the model.

The main problem with these DFAs is that their functions grow exponentially with the number of states, which affects the surface-area requirement of semiconductor material (in particular silicon). This is why models containing numerous intercommunicating automata are preferred. Such a computer model is called a "complex, cooperating automaton".

2.3 Representation of Boolean Functions

A Boolean function or logic function is a transformation f: $B^m \rightarrow B^n$, where $B=\{0,1\}$, which can be represented in the form $f=(f_1, f_2, \ldots f_n)$, i.e. as a vector of functions $f_k: B^m \rightarrow B$. Thus all the functions $f_k$ dealt with below are assumed to have an output value; these are denoted in general as f.

It is also known, that f can be represented in a disjunctive or conjunctive normal form. For the disjunctive normal form, this means that $$f=z1+z2\ldots+zk, \text{ where } k=1, 2, \ldots, 2m, \text{ and '+' is an OR operator (logical OR)} \quad (1)$$

and $$zi=y1*y2*\ldots yn, \text{ where } i=1, 2, \ldots, k \text{ and '*' is an AND operator (logical AND)} \quad (2)$$

Obviously only those zi are used for which the function to be described receives the value TRUE or '1'. The notation yj here defines how an input bit $i_k$ from the input vector $x=(i_1, i_2, \ldots i_k)$ is to appear. Whereas only values from the set $\{0, 1\}$ are allowed for the input bits, this must be changed for yj: one of three attributes $\{0, 1, -\}$ is assigned to these values. The attribute '1' for yj means here that $i_k$ is adopted unchanged, a '0' means that $i_k$ must be selected in inverted form (denoted by /$i_k$), and '-' stands for don't care i.e. $i_k$ is not used. If only the values $\{0, 1\}$ are used as attributes for yj, this is referred to as the "canonical disjunctive normal form".

This representation is important because, for a known sequence of input bits, it enables the sub-expressions zi given in equation (2) above, also called "terms", to be represented as "string terms": for a sequence i1, i2, i3, "111" means that z1=i1*i2*i3, "0-1" stands for z2=/i1*i3 etc.

For three input bits, the set of all possible input vectors is v={000,001,010,011,100,101,110,111}. If, for example, the function f only receives the value TRUE on the input vector {001,011,111}, then only these need, or are allowed, to be specified; in the form of string terms, this can be done by 111 and 0-1. This fully characterizes the given function and is isomorphic to the disjunctive normal form f=/i1*i3+i1*i2*i3

2.4 Content Addressable Memory (CAM)

Read/write memory devices [RAM (Random Access Memory)] are normally used for storing data and programs. In this case, an address is present on the address bus, and for the read operation, the stored item of data is present on the data bus after a device-specific delay has elapsed, and can be reused. The write operation works in a corresponding manner.

The address is known to the instance that would like to receive the data (e.g. a processor), and the stored content not known in advance. There are applications, however, in which the relationship is exactly reversed: the stored content is known, and of interest is the address at which this content is stored, where the answer may also be "not present". Memory devices that support this type of query are called "Content Addressable Memories" [CAMs].

Memory devices that are known as CAMs and support this behavior directly are classed as special devices and are not at all common. For practical applications, however, the functionality of the CAM can be emulated by standard RAM devices. To achieve this, for all items of data that were to be stored directly in the CAM, but which produce the memory address rather than the value in response to a query, the corresponding addresses must be computed first and then saved at the RAM address corresponding to the item of data.

2.5 Cellular Automata

Cellular automata [CAs] are a set of finite automata that are arranged in an array having a fixed topology, and which have additional properties (cf. citations [1] and [4]). This set of FSMs is arranged as an n-dimensional array (usually n=2), where fixed coordinates are given for each position. Each FSM uniquely has neighbors that can be communicated with. In the case n=2, usually the four surrounding FSMs (in the compass directions N, E, S, W, hence also referred to as a "NEWS neighborhood") are regarded as neighbors.

Communication with the neighbors is performed such that the states of the immediate neighbors can be read and hence evaluated. The state of all cells is computed in parallel at every time step. If data from cells further away are to be used to compute a new state, then this data must be transported step-by-step from cell to cell. Thus conventional cellular automata are well suited to computing problems having high data locality.

CAs are regarded as universal computers, like the architectures discussed above; they also work completely in parallel. If a network of CAs is to be modeled in a hardware circuit e.g. in an ASIC or even a PLD, the number of connections increases linearly with the number of automata. The connections themselves, depending on the selected topology, are only relatively short and hard-wired. The complexity of intercommunication between CAs is also relatively low. If the complexity of a logic function is taken to be the amount of memory required to model this logic function in a RAM, then the maximum complexity of the logic function, which is equivalent to the behavior of a cell, increases exponentially with the number of input variables and linearly with the number of output variables of the function. The number of input variables in this case is the sum of all the bits that are required to encode the states of all the CAs connected to the cell, including the state of the cell itself. Thus the maximum complexity of the cell is substantially limited by the number of connections of each of the automata.

The concept of global cellular automata [GCAs] overcomes the limitations of CAs by allowing connections from a cell not only to its nearest neighbors but to any cells in the whole array. Thus a GCA no longer has a fixed topology but enables the use of a topology that is adapted to suit the problem and, if necessary, even changes as the computation is running. This can result in considerably faster program execution. It may be that the number of connections from a single automaton is set by an upper limit. One refers to one-armed GCAs if just one single connection is allowed, and to k-armed GCAs in general.

As a consequence, when implementing an array of GCAs, the required complexity for intercommunication between cells increases sharply with the number of cells. The number of possible connections between the individual automata increases as the square of their number.

Like conventional CAs, the complexity of the individual automata themselves i.e. the logic function that they represent, depends substantially on the number of connections of each of the cells. If a GCA is to be modeled in a reconfigurable circuit (PLD), then every single cell, which can implement any logic function of course, must allow the maximum possible complexity.

If each of the automata is modeled in a respective computer unit having local memory, then each cell can also implement complex logic functions. The complexity for any communication of all cells increases as the square of the number of cells. The granularity of the circuit is then defined by the number of cells, i.e. the bit width of the connections between the cells. Such a circuit can implement very well those GCAs whose number of FSMs and bit width correspond to the given parameters of the circuit. Complex logic functions can also be implemented in each individual cell. This has the disadvantage, however, that GCAs whose number of connections and their required bit width do not correspond to the given granularity can only be modeled in the circuit with difficulty.

If the individual cells are designed as a combinational circuit, then each cell must be capable of processing data from all the other cells including its own state. For this reason, each combinational circuit must be able to implement logic functions that may contain all binary encoded states of all cells as input variables. The number of output variables of the logic function must simply enable all the states of an individual cell to be binary encoded. The disadvantage here is that the complexity of the logic function increases exponentially with the number of input variables. Another disadvantage is that the complexity of cell intercommunication increases as a polynomial function.

A (re)configurable architecture (PLD) suitable for integrating a GCA must therefore be able to integrate any complexity for each FSM. This means that, assuming the FSMs are to be modeled directly in a cell of the PLD, the cells must be able to integrate any function. It is known that this results in an exponential growth in the cell size. The configurable network in the PLD must also be fully implemented, i.e. it must be possible to connect every cell output to every other cell. Thus the network grows quadratically, likewise the configuration of the network.

At present there are no known PLD architectures that satisfy both requirements: large cells having complete freedom of design do not exist; there are only small cells having complete freedom of design ["look-up table structure" (LUT)], or large cells without the full set of options to model any functions. A full interconnect capability of all cells is only possible for large cells. Modeling GCAs in existing PLDs is hence difficult, and often even impossible.

To avoid the aforementioned problems, the previously unpublished German patent application DE 10 2004 007 232.9 dated 13. Feb. 2004 and entitled "Rekonfigurierbare Architektur zur parallelen Berechnung beliebiger Algorithmen" ["Reconfigurable architecture for parallel computing of any algorithms"] proposed an architecture of a computer that comprises at least one individually configurable and/or reconfigurable combinational circuit, whose output variables at a time $t_{n-1}$ form the input variables of the combinational circuit at time $t_n$, and which is equipped with means for storing the output variables of the combinational circuit between the times $t_{n-1}$ and $t_n$.

Here, times $t_{n-1}$ and $t_n$ are used to denote immediately consecutive evaluations of the logic function. In a technically advantageous implementation, these times can be derived from an applied clock having a clock period T, so that $t_n-t_{n-1}=k \cdot T$, where $k=1, 2, 3, \ldots$. For a given application, k is constant; a different value for k can be selected for different applications.

Having established that the complexity of the logic function increases exponentially with the number of input variables, and linearly with the number of output variables, i.e. the number of cells in the array of the GCAs to be modeled, and the complexity for intercommunication between the GCAs increases at least quadratically with the number of cells, the proposed (re)configurable architecture is suitable for integrating GCAs. For this purpose, it comprises at least one single configurable combinational circuit, whose output variables at time $t_{n-1}$ form the input variables of the combinational circuit at time $t_n$. Between times $t_{n-1}$ and $t_n$, the outputs of this combinational circuit are stored in a memory, such as registers in particular, so that a sequential circuit, or in other words an FSM is created.

The design of the proposed architecture can also include the following:

Registers can be provided as storage means.
The combinational circuit can have a three-stage design in particular.
Therein
a first stage contains a plurality of memory devices connected in parallel, which can be addressed via input lines, where a subset of the input variables linked in an associated, determined implicant can be input to each memory device,
a second stage comprising memory devices is located downstream of the first stage, where the memory devices are to be addressed by indices of the individual implicants,
and
a third stage is located downstream of the second stage, comprising means for a disjunctive combination of the output values of the individual implicants from the memory devices of the second stage.
Therein the individual implicants can be determined by minimization methods.
In addition, the first stage and the second stage can be connected together via at least one "crossbar switch".
CAMs and/or RAMs can be provided as the memory devices.
It is particularly advantageous to integrate at least one GCA.
Magnetoresistive components, in particular TMR type devices, can be provided as memory elements. Suitable tunnel magnetoresistive elements are known per se.

The further embodiments defined above for the proposed architecture are based in particular on the considerations given below.

Although the complexity of a logic function in the selected combinational circuit increases linearly with the number of output variables, all the complexity for intercommunication between cells is dispensed with. A large number of individual automata having few output variables can be modeled in such a logic function, or a small number of GCAs having a large number of output variables, or an assortment of different cells. This means that there is no prescribed granularity, and intercommunication between FSMs is theoretically fully possible. A limit is set, however, by the maximum complexity of the logic function that the combinational circuit can accommodate.

The use of a combinational circuit having a large number of inputs (this will arise generally when a GCA having a number of FSMs is modeled) means that again it may result in the surface-area requirement having a form of exponential dependency on the number of inputs. The upper limit is given by a growth in the surface area of exp(number of states), when every state is encoded in one bit; in general, the surface-area requirement is lower. Since a universal circuit must include the maximum case, however, the exponential growth law would need to be applied.

In this case it is considered particularly advantageous to partition the circuit that includes the combinational circuit into three specific sections/stages. A (re)configurable circuit is defined for this purpose, which can implement as a combinational circuit, logic functions having a large number of input variables and a large number of output variables.

Figure 4:
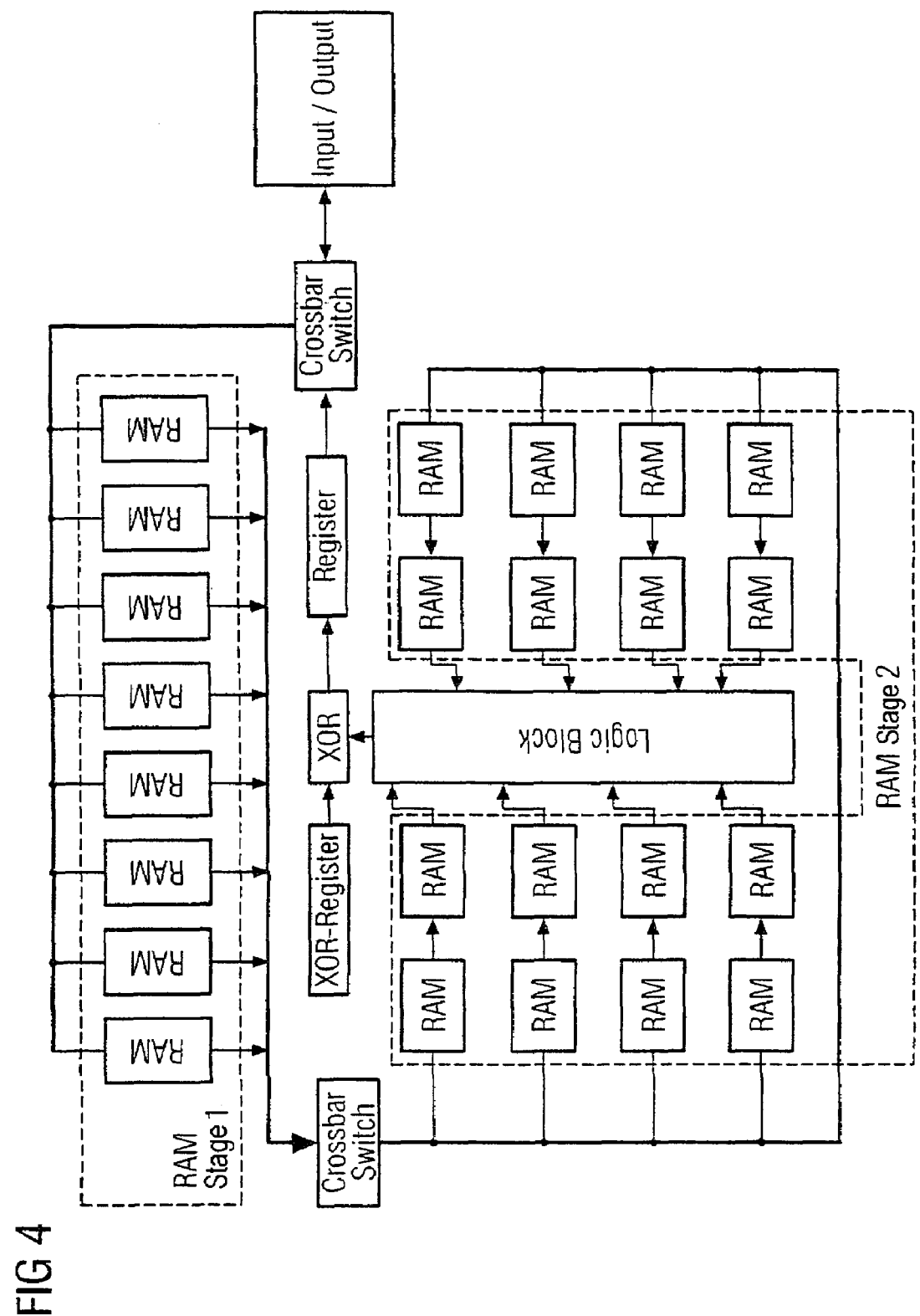

In order to design a reconfigurable combinational circuit for logic functions, two options are considered initially:

First, it is possible to store a logic function completely in a RAM. The input variables of the logic function form the address bits, and address a memory cell for every possible combination of input variables. The content of this memory cell then equals the value of the logic function; the data lines of the memory device form the output variables of the function. The advantage of this concept lies in the simple design of the circuit, straightforward reconfigurability, the high integration density of memory devices and the fixed period of time needed to evaluate the logic function. The number of memory cells required, and hence the size of the memory device required, does increase exponentially with the number of input variables, however. For this reason, only small logic functions can be modeled in this way.
This is the state of the art in PLDs and is implemented as a look-up table structure in FPGAs, usually having four binary input variables and one binary output.
A second option for modeling logic functions in a combinational circuit is to arrange gates configurably in a two-stage or multi-stage circuit. It is thereby possible to model logic functions in combinational circuits using a minimum number of gates. Circuit theory provides advantageous embodiments of logic functions in this case, such as the Reed-Muller form, or even powerful logic minimization algorithms. The advantage of this approach is in the minimum use of gates and in the possibility of using powerful minimization methods and algorithms (cf. citations [2] and [3]). This method is well suited to representing a fixed logic function e.g. a ROM implementation. The individual gates can be connected together reconfigurably via hardware devices such as crossbar switches, although in this case the complexity for the reconfigurability increases exponentially with the number of input variables of the logic function.
The proposed architecture comprises, as shown in FIG. 4 in its practical embodiment, a RAM-based primary part having a structured RAM unit called the second RAM stage that comprises a plurality of RAM blocks and is connected addressably via a bus system to the output of a crossbar switch. Data from a first RAM stage is applied to its input. Downstream of the second RAM stage comprising a logic block is located an Exclusive-Or logic unit in the form of an "XOR" element, whose data is input to a register unit, which is connected to a further crossbar switch. Via this crossbar switch, external input data is input to the first RAM stage, and the output data is output for further processing. In such an architecture, the memory areas are partitioned in advance.

3) PROBLEM

The object of the present invention is to design the proposed computer architecture in such a way that it is possible to perform a rapid computation for a larger degree of adaptation to suit requirements of the given application while incorporating the memory areas, i.e. making good utilization of surface area.

4) SOLUTION

The cited objective is achieved according to the invention by the claimed measures, according to which the computer having a reconfigurable architecture is to contain the following parts, namely
a RAM-based primary part comprising
a structurable RAM unit comprising a plurality of RAM blocks,
a first crossbar switch, where external input data on the architecture is to be applied to its input, and whose output is connected to the input of the RAM unit via a first bus system, and
a second crossbar switch, whose input is connected to the output of the RAM unit via a second bus system, and whose output is connected to the input of the first crossbar switch via a third bus system in order to feedback output-side data from the second crossbar switch to the input of the first crossbar switch, where address signals produced by the first crossbar switch are to be input to the RAM unit and the second crossbar switch for addressing, and where the output-side data from the second crossbar switch, if necessary after further processing, is also to be input to an output network for the output of output data on the architecture, plus means in an additional control part for sequential control of the primary part, comprising a counter unit, where a common clock signal is to be input to the counter unit and to the first crossbar switch, and where counter reading signals produced by the counter unit are to be input to the first and second crossbar switches.

The term "configurable" is to be understood here in the sense of "definition and/or adjustability of characteristic variables, in particular of the structure used for operation, which affect the continuing behavior of the computer part concerned". The term "programmable" is to be taken to mean "the facility to change a current program state or program sequence, on which operation of the computer part concerned is based.

The advantages associated with the inventive embodiment of the computer lie in particular in achieving increased flexibility compared with the proposed device as regards adapting to suit possible applications, where fixed partitioning of the memory areas in advance is not involved. The architecture according to the invention is suitable for integrating global cellular automata and similar computer architectures. In these architectures, computing a new state requires relatively little time; only the number of passes needs to be taken into account for this. The architecture is also flexible in the partitioning of the memory into the individual computing steps while also allowing the number of passes to be varied. This form of computer architecture is particularly suitable for highly time-critical computations in embedded applications such as in the automotive sector, for communications technology and for automation engineering, in particular where controllers operate on a cyclical basis.

Thus in this basic structure of the computer, the output signal appears directly as part of the output-side data that is output from the second crossbar switch and carried via the third bus system. This means that the output-side data need not necessarily be buffered or processed further. In this case, however, the number of passes is set in advance.

In the computer according to the invention, the RAM unit is used so that a reconfigurable Boolean function of the input data is implemented at the output. This means that the inputs constitute the address bus of the RAM unit, and the outputs constitute the data bus of the RAM unit. The RAM unit is thus operated as a ROM (Read Only Memory); data is only written to the RAMs during (re)configuration.

From this viewpoint, the RAM unit is operated as a sequence of small LUT (look-up table) structures, where the size and number of LUTs is adjustable.

The counter reading signals to be input to the first and second crossbar switches indicate which point of the aforementioned sequence the computation has reached. The form of the computation is designed here so that part of the RAM unit is used for each cycle, and a complete computation requires a plurality of such cycles. Each cycle is identified by the counter unit, and the crossbar switches are reconfigured in each cycle to the specific value in order to enable the sequence. The counter unit and the compare unit together determine when the sequence has finished.

In this way, the measures according to the invention advantageously enable a universal computing engine that combines extremely fast computation with optimum utilization of surface area. These measures are based on the GCA (Global Cellular Automaton) model, which is universally known. This model can be implemented relatively easily in a single LUT. It is advantageous in this form, because communication is/can be global in the GCA. It is precisely this communication that in the prior art creates great problems in implementing a GCA in a known PLD.

In addition, however, in the prior art, a very large LUT exhibits the problem that the surface-area requirement grows exponentially with the inputs in the form of address lines. Thus sizes of LUT are normally limited to a maximum of five inputs.

The invention now enables a GCA and hence a universal computer to be modeled on a sequence of LUTS. The sequence can be configured by the counter (having $1 \ldots X-1$ cycles); utilization of the RAM unit is excellent, i.e. far more complex algorithms can be accommodated in the same size of RAM. Thus at the expense of processing time (=number of sequences·cycle time), this device can adapt the surface area requirement so that the problem can be handled in full. The surface-area utilization is hence advantageous.

Advantageous embodiments of the computer according to the invention follow from the claims dependent on claim 1, where the embodiment given in claim 1 can be combined with the features of one of the dependent claims or preferably even with the features of a plurality of dependent claims. Hence the design of the computer can also include the following:

For storing and processing the output-side data/signals from the second crossbar switch, it is advantageous if the output-side data is initially to be input to a programmable Exclusive-Or logic unit. Such an Exclusive-Or unit is provided to increase the freedom of design.

Independently therefrom or preferably additionally thereto, the output-side data/signals from the second crossbar switch can be input to a downstream register unit whose output is connected to the output network for the output of output data on the architecture. Such register units make the outputs more stable.

Therein the counter unit can advantageously be assigned a configurable compare unit, which is to receive the common clock signal, where a clock signal that comes from the compare unit and controls the data transfer from the Exclusive-Or logic unit is to be input to the register unit, and a reset signal from the compare unit is to be input to the counter unit.

In addition, it is advantageous if the RAM unit contains RAM basic cells that comprise the RAM blocks combined by an OR/MUX switch.

Therein, address signals from the first crossbar switch can be input to the OR/MUX switch.

CAMs can also be provided advantageously as the memory devices. It should be borne in mind here, that the way the RAMS are connected and used corresponds to that of a CAM to some degree: namely it is not the content being sought but the location of a specific content. This means that one can replace or extend part of a RAM with a CAM. CAMs can also be used for the RAM-based primary part to this extent.

It is particularly advantageous to integrate or implement at least one GCA. A GCA comprises a connection of a plurality of single state-automata. A state automaton computes in one clock cycle, in particular of the clock signal from the compare unit, the new state from the previous result (state) and the input values. In a GCA, a plurality of such state automata are then integrated, where some of the outputs of the individual automata are connected to inputs of other automata. This constitutes the connection. The individual automata are then implemented so that they are "adjacent" in hardware. This means that, if there is a register unit, a number of registers represent the state in binary encoded form for each state automaton. If there are no registers, then this is an "asynchronous" automaton; in this case, some of the lines of the third bus system are used for state encoding. The automata are then implemented "individually" in a manner known per se. The first and second bus systems are to be used for the connection. Multi-partitioning of the RAMs can be used here to extend the opportunity for implementation.

Magnetoresistive components, in particular TMR type devices, can preferably be provided as storage elements. Suitable tunnel magnetoresistive elements are sufficiently known.

Figure 5:
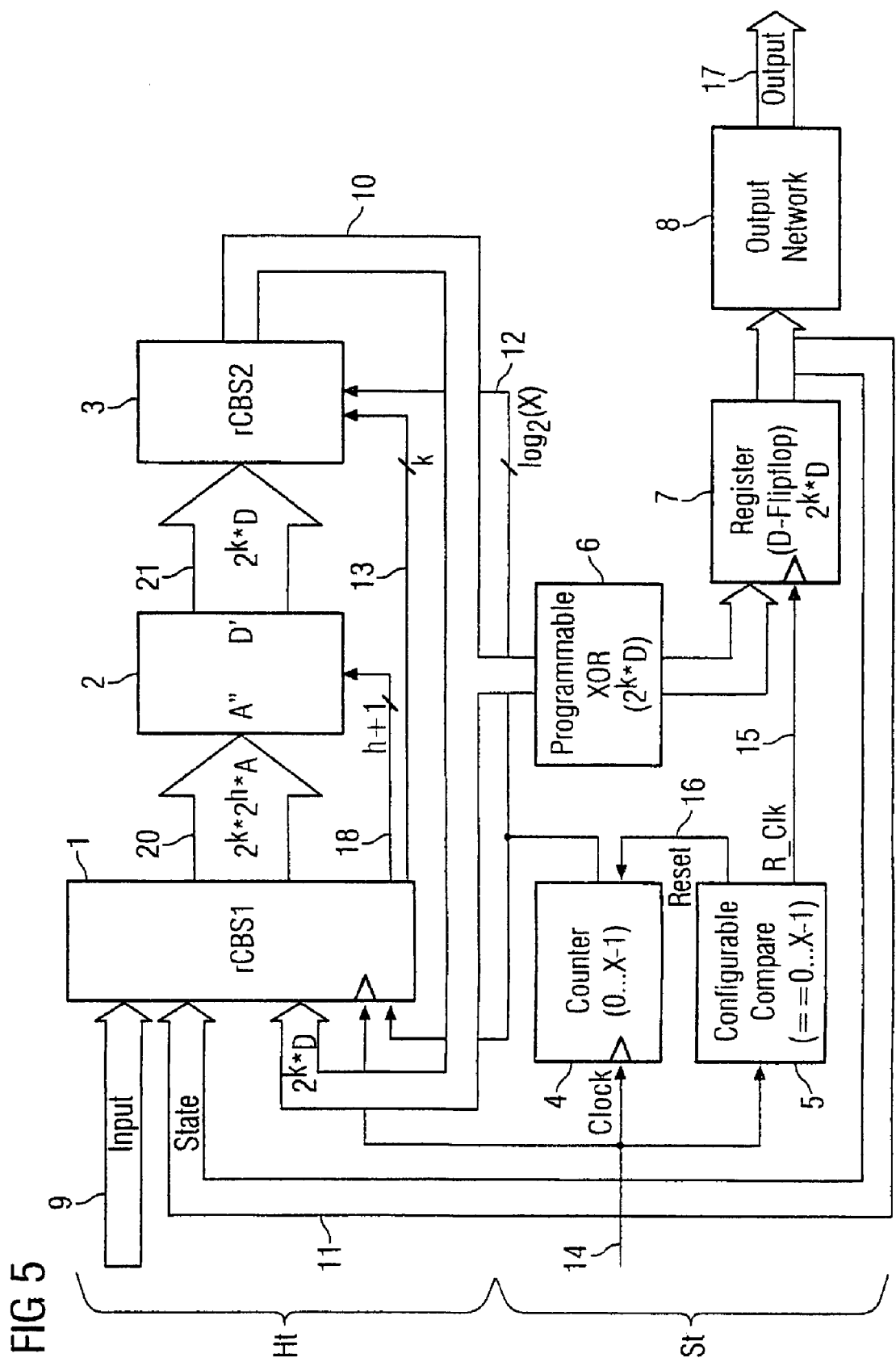
Figure 6:
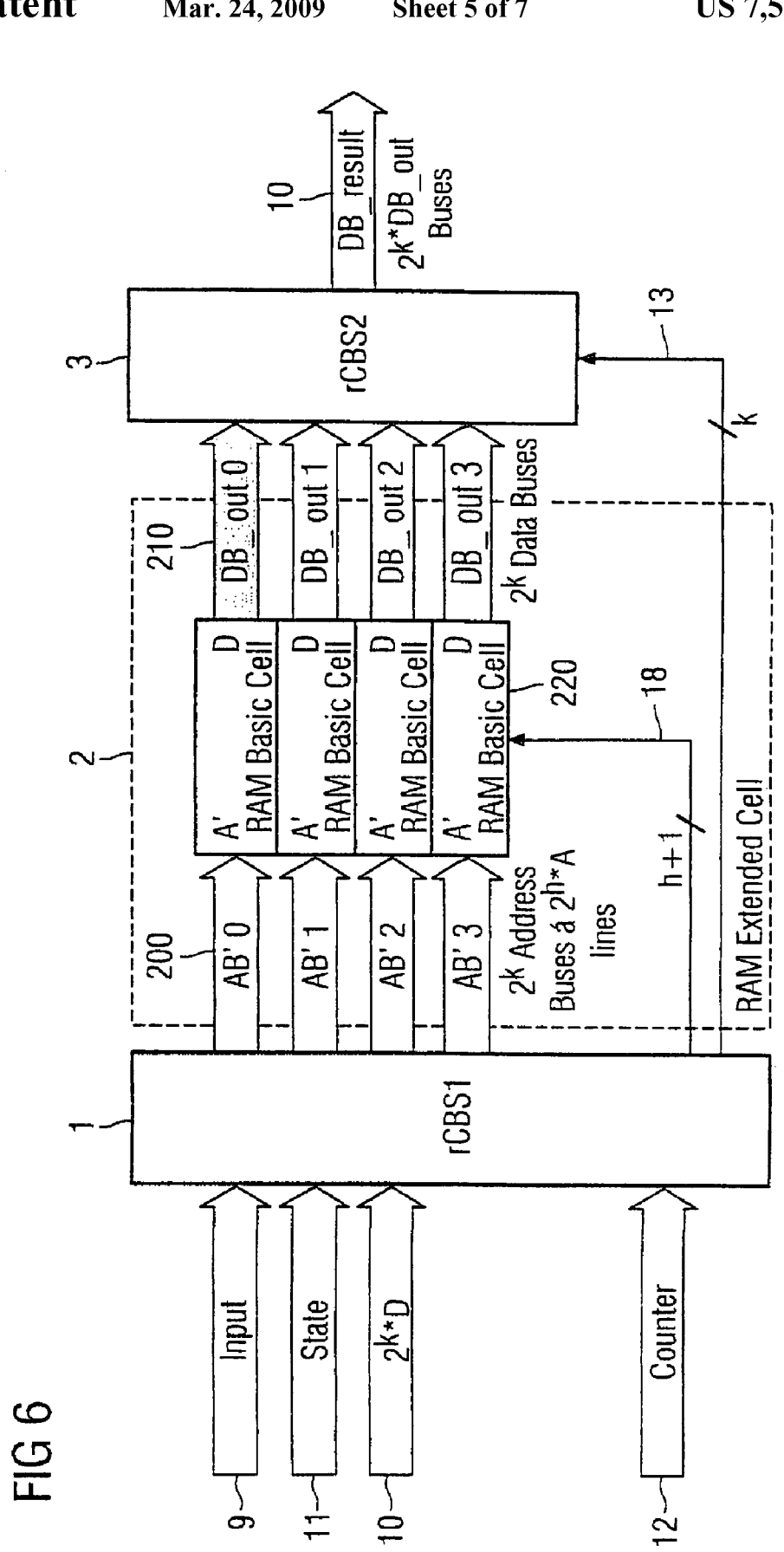
Figure 7:
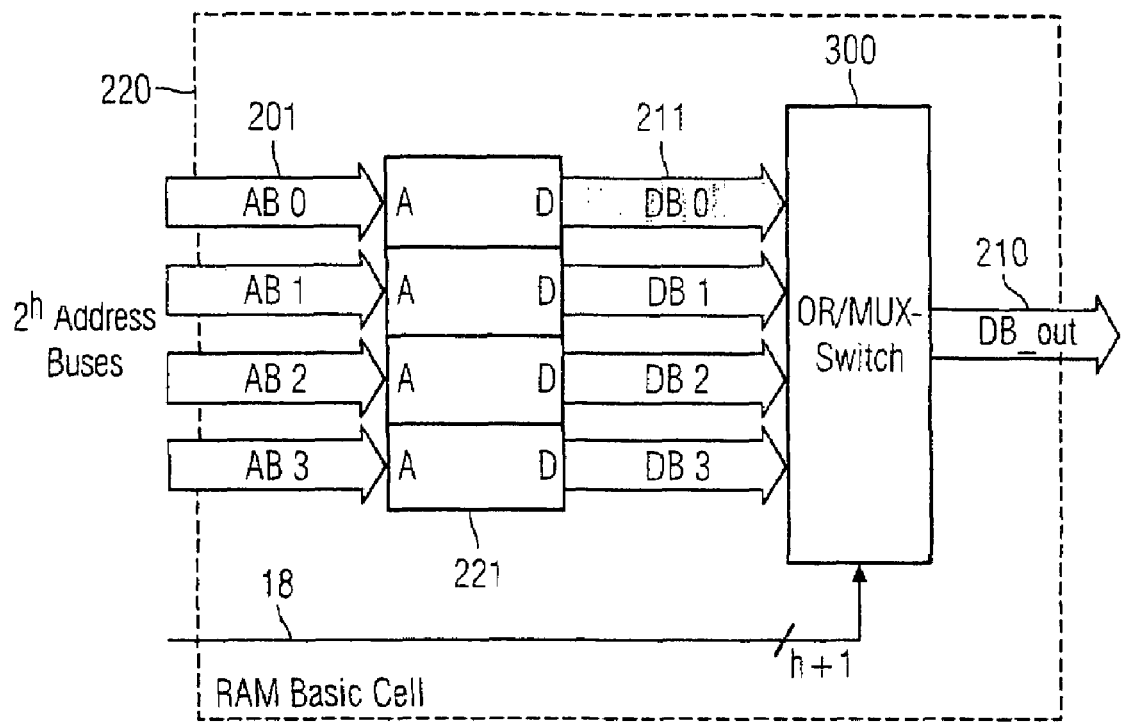
Figure 8:
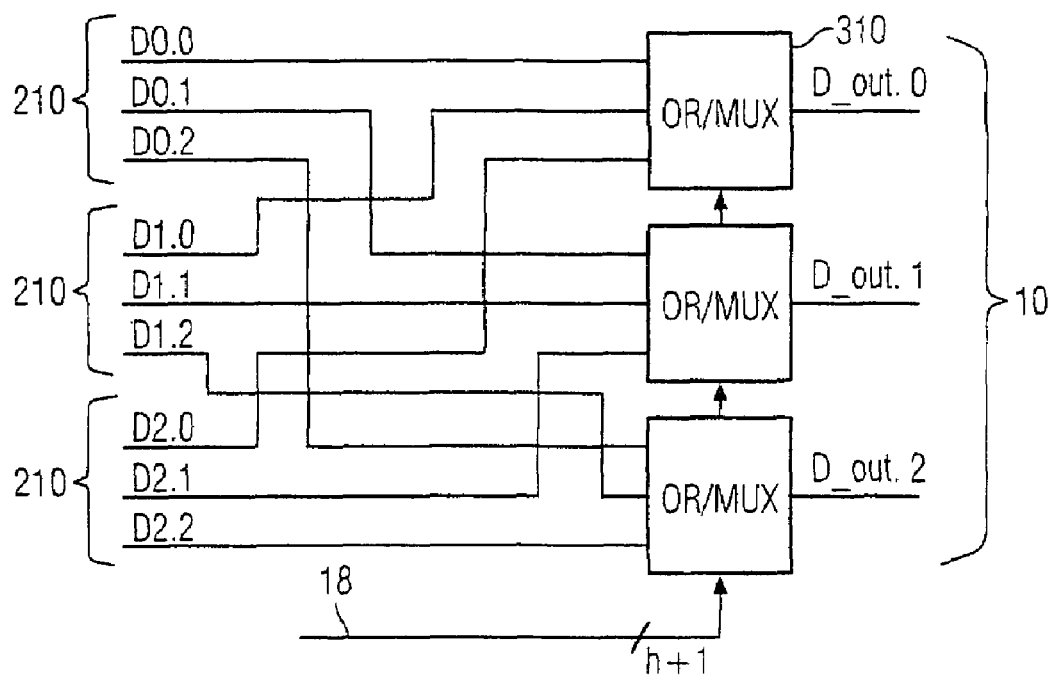
Figure 9:
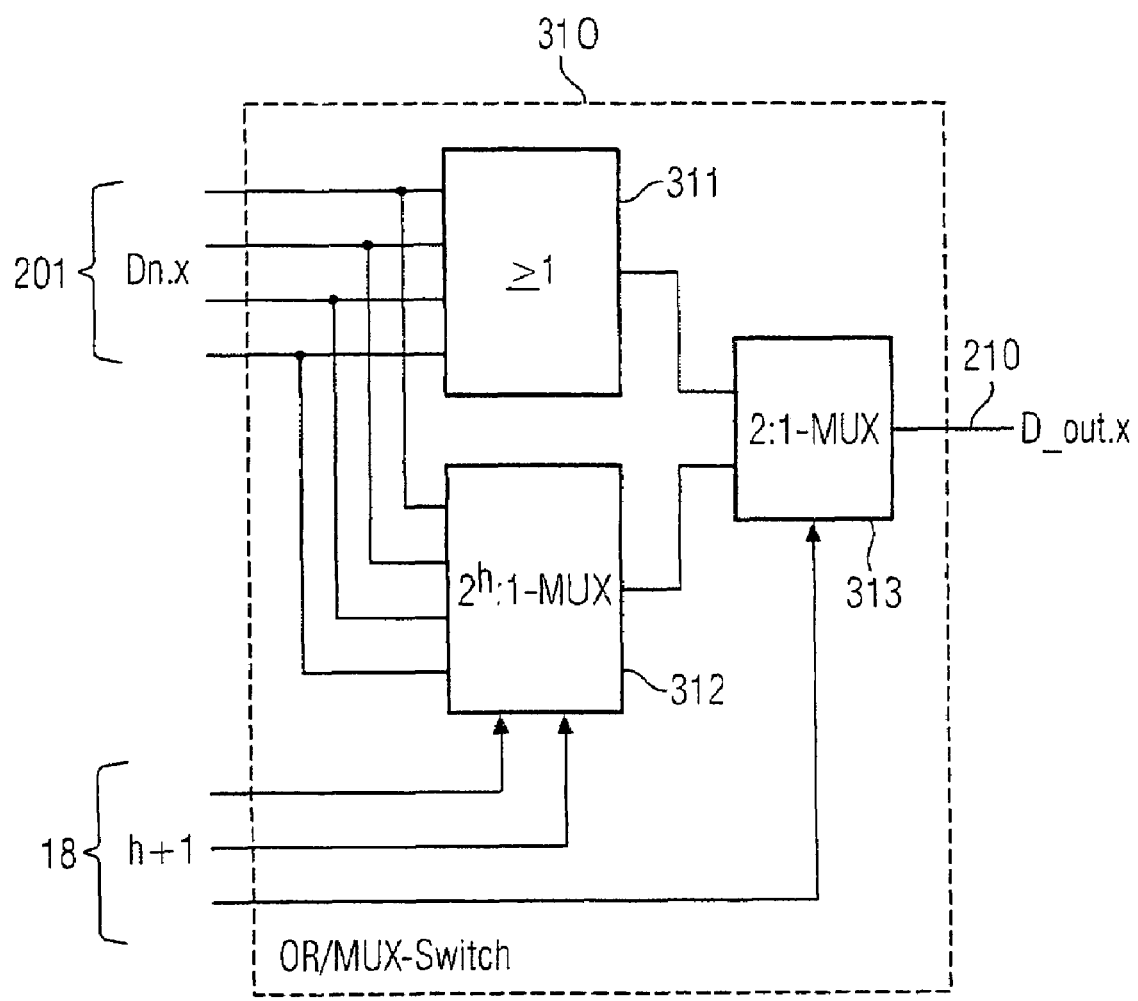

The design and operation of the computer according to the invention are described in greater detail below with reference to the drawing, where FIGS. 1 to 4 concern the prior art as presented above, and in contrast FIG. 5 shows the full design of a structurable, reconfigurable RAM architecture of an apparatus according to the invention, FIG. 6 shows the design of a RAM area or RAM unit having associated reconfigurable crossbar switches, FIG. 7 shows the design of a RAM basic cell, FIG. 8 shows the design of an OR/MUX switch and FIG. 9 shows the internal structure of this specific switch.

In FIGS. 5 to 9, equivalent parts are given the same reference numbers, where 1 denotes a first crossbar switch rCBS1,
2 denotes a structurable RAM unit or RAM,
3 denotes a second crossbar switch rCBS2,
4 denotes a counter unit,
5 denotes a configurable compare unit,
6 denotes a programmable Exclusive-Or (XOR) logic unit,
7 denotes a register unit,
8 denotes an output network,
9 denotes an input bus to the circuit,
10 denotes a third data-bus system for feedback,
11 denotes state signals,
12 denotes counter reading signals,
13 denotes address signals,
14 denotes clock signals,
15 denotes derived clock signals R_Clk,
16 denotes reset signals,
17 denotes an output bus of the circuit,
18 denotes address signals,
20 denotes a first, input-side bus system,
21 denotes a second, output-side bus system,
Ht denotes a RAM-based primary part,
St denotes an additional control part.

Further illustrated parts and their notations are discussed in following text.

5) DESCRIPTION OF THE INVENTION

The RAM-based primary part of the architecture shown in FIG. 5 and generally denoted by Ht comprises the two reconfigurable crossbar switches rCBS1 and rCBS2 denoted by the assigned reference numbers 1 and 3, the structurable RAM unit 2, the connecting bus systems 20 and 21 denoted by address bus (A) and data bus (D) in the figure, the additional address information 13 and 18, the data bus 10 providing feedback and also constituting the input for the state registers of the unit 7, and the connection buses 9 and 11 for the inputs to the circuit and feedback of the previous state 11.

The additional circuits constitute the additional control part, generally denoted by St, for integrated, configurable sequential control, plus the interface to the output. These circuits include the resettable counter 4, the compare unit 5, which can be configured with a reset value, the configurable Exclusive-Or logic unit or XOR unit 6, and the registers 7, usually designed as D flipflops. The clock 14 is applied to both the counter 4 and the rCBS1 (1). These two units are controlled directly by the clock in the sense that data is transferred on the positive (optionally also negative) clock edges. Data is transferred into registers 7 by the R_Clk 15 derived from the clock 14. This clock is only enabled, i.e. a positive (or negative) clock edge only appears at the register 7, when the comparison in the configurable compare unit 5 produces a positive result. This is the case when the count value equals the compare value. In this case an active reset signal 16 is sent to the counter 4, also on a positive clock edge.

The output of the registers 7 is connected as the previous state via data bus 11 to the rCBS1 unit (1) and to the output, the output (logic) network 8. In this network 8, the states in the usual form can be converted into output signals; this unit otherwise has no further relevance to the invention.

5.1 Operating Principle of the Architecture Configured According to the Invention The memory, designed as a structurable RAM and explained in greater detail in this disclosure, is used as a memory for tables. One can thus envisage that the first table is stored in the first part of the memory, for instance expressed by lower addresses. The values from this first part can then be used to address the second table in the memory, e.g. located at middle addresses, next the third table etc. until the result is established.

The application according to the invention is thus aimed at integrating in a device cellular automata (CA) comprising arrays of finite state machines (FSM). It thereby makes particular but not exclusive use of features that are disclosed in the cited, previously unpublished German patent application DE 10 2004 007 232.9, which develops and describes the concept of implementing global cellular automata (GCA) on a configurable architecture.

5.2 Operating Principle in Detail

The significance of the counter 4 is to define the number of tables specifically required for the application. This must be seen in conjunction with the compare register 5 (Configurable Compare): prior to actual operation, a number is saved in this register that defines the number of passes during operation that are required to re-compute in full the next state. A '0' in the compare register 5 here means that only one table, the classical look-up table (LUT), is used, a "1" represents two tables etc.

Thus whereas the counter 4 is designed as a binary counter having an asynchronous reset, for instance counting from 0 to X−1, where X can advantageously but not necessarily represent a power of 2 (for instance 4, 8, 16 . . . ), the actual final count value is defined by the compare register of unit 5. The end of accesses then means that the next state has been fully computed and now can be stored. The control of this memory operation is performed in the compare register, specifically by controlling the clock.

To do this, the clock signal 14 in the configurable register of the compare unit 5 is combined with the actual comparison to produce the new signal R_Clk 15 so that a positive edge is only produced when the equivalence comparison is true, i.e. when count value=compare value. At the same time, the reset signal 16 is generated in such a way that the counter 4 is reset in a defined manner to the value 0, which is also the start value. Generating such signals 15 and 16 is generally known in the prior art and thus does not need to be described further. In order to be able to do this, the counter 4 must be equipped with an input for asynchronous reset by the relevant reset signal 16.

The RAM unit 2 forms the heart of the circuit. This RAM unit comprises on the input side the address bus of the bus system 20, divided into a plurality of address sub-buses. In addition, address information 18 having h+1 lines is provided. This is required in order to control the individual passes and hence the access to the sub-tables. The results of the table accesses—one sub-table is accessed per clock cycle, partially in parallel—are output via the data bus of the bus system 21, which in turn can be divided into a plurality of data sub-buses. The additional information (1 bit) is required in order to switch between a multiplexing operation and an OR operation in the last pass.

The information appearing on the address bus 20 and on the address information 18 is put together by the reconfigurable crossbar switch rCBS1 1. For this purpose, the input bus-systems input 9, state 11 and feedback 10 of the last table value read out are provided, from whose information it is possible to put together the address bus for the next clock cycle. The current value of the counter 4, which is a coding of the cycle currently in progress, and the clock 14 are used for additional control.

This clock 14 can be used to buffer the input values so that they are applied to the RAM unit as stable values. This is not necessary for the state 11, because these values are stored, but proves advantageous for the input 9 and the feedback via data bus 10. Alternatively, the feedback 10 could also be stored back in rCBS2 (3). It is assumed that each input, apart from the inputs to the data bus for state 10, can be configured as being buffered or being coupled in directly without buffering.

The element rCBS1 1 can be designed as a crossbar switch, which means that each output of the rCBS1 is to be connected to each input; this connection is user-configurable. Since the selection of the inputs also depends on the current counter reading, it is advantageous to design this CBS either as a reconfigurable CBS, in which a new configuration is to be loaded into the memory for each counter reading, or as a user-configurable circuit in which the output selection can be made dependent on the counter reading. A design as a reconfigurable circuit is described in citation [2] amongst other sources, whilst the user-configurable structure corresponds to commercial programmable logic devices and is described e.g. in citation [3].

Generation of the additional bit (additional information) must be performed in the form of a user-configurable circuit, if this bit is not already generated in the counter 4 by establishing equivalence between count value and compare value, and this bit is then used. The second option is far simpler but also less flexible, so in general it is assumed that the additional bit is generated in rCBS1.

The output of the RAM unit 2 is processed further by the second reconfigurable crossbar switch rCBS2 (3). The address information 13 having k bits, which enables selection from the $2^k$ data buses, is additionally needed to do this; in addition, the value of the counter 4 is transmitted via the count bus 12 using $[\log_2(X)]$ bits (which implies a rounding). The same information provided for rCBS1 on configurability and layout also applies to rCBS2.

For the final counter reading, the feedback 10 produces the next state, while previous counter readings each produce intermediate results. The next state is to be stored, however, and provided externally directly or in converted form at the output 17. For this purpose, the output at 10 can be inverted in the configurable XOR element (programmable XOR) 6, if this proves advantageous. It is known in this regard that the representation as minimized disjunctive normal form (DNF) is more complex in about half the cases than the representation in the inverted minimized disjunctive normal form (IDNF), and vice versa. The unit 6 has been added to enable both forms.

The state is then stored if applicable in partially inverted form in the registers 7, controlled by the clock R_Clk 15. The output at output 17 is then made again in converted form if applicable by the configurable logic circuit output network 8, in which the signals required externally are computed from the states or their representation. This constitutes a standard procedure.

5.3 Design of the Individual Elements

RAM Area or Unit 2

FIG. 6 shows the design of the complete RAM area including the reconfigurable crossbar switches 1 and 3, which are not part of it.

The whole RAM area 2 is partitioned into a number of RAM basic cells 220. This number is advantageously but not necessarily a power of 2, i.e. 2, 4, 8, 16 . . . ; 4 basic cells are shown in FIG. 6. The advantage of such a number is that e.g. 4 cells of size M can be combined into an area of size 4*M. This possible combination of $2^k$ basic cells 220 in FIG. 6 is performed in rCBS2 (3) using the information transmitted by the k lines 13.

If the RAM basic cells are not combined or only partially combined by the current configuration in rCBS2, the opportunity presents itself of segmenting the RAM and thereby guaranteeing the principle of operation that was described above in sections 5.1 and 5.2.

The connection between rCBS1 (1) and each of the RAM basic cells is made in each case by an address bus 200, which in its entirety forms the address bus 20 (FIG. 5). The assignment of the lines of each address bus is configurable in rCBS1 (1), where the bus systems 9, 10 and 11 and the counter reading 12 are available as inputs. In addition, the address information 13 of k bits indicates in what manner rCBS2 (3) is to use the information read out on the data buses 210. The information 13 can be generated e.g. from the counter reading 12: for pass 0, RAM 0 is used, for 1, RAM area 1 and so on; far more complex selection patterns can also be configured however. The output 10 of rCBS2 (3) has for this the same data-bus width as the sum of all the data buses 21 from the RAM basic cells.

RAM Basic Cell 220

FIG. 7 shows a diagram of the RAM basic cell 220. It comprises a number of RAM basic blocks 221 that have the same design as a standard RAM device. Here, the address of the RAM memory block to be read out is applied to the one address bus 201 at a time; once the usual access time has elapsed, the result appears on the respective data bus 211.

The number of RAM basic blocks 221 in one RAM basic cell 220 equals four in FIG. 7. The actual number advantageously but not necessarily equals a power of 2, i.e. 2, 4, 8, 16, . . . . The number of RAM basic blocks determines the granularity by which the whole RAM can be partitioned into the different cycles that run in an application. The number of RAM basic cells 220 in the RAM unit 2, on the other hand, determines the degree of parallelism and hence the data-bus width that can be used.

A configurable switch 300, labeled as an OR/MUX switch, a combination of an OR and multiplexer selector circuit (where MUX=multiplexer), belongs to the RAM basic cell. Here it is decided on the basis of the address information 18, which of the data buses appears at the output DB_out 10, or whether the data buses are even combined logically with each other before being output. This combination is necessary in the final stage of the engine, as explained in the previously unpublished German patent application DE 10 2004 007 232.9, in order to enable the required functionality.

FIG. 8 shows the design of the OR/MUX switch 300. It can be seen that the data is connected on a bit-by-bit basis. In the diagram (the data-bus width is limited to three for illustrative reasons), it is clear that the data bits having the suffix 0 of each data bus 210 are brought together into a logic subunit 310, while the data bits having the suffix 1 are brought together into a different subunit 310. All the subunits 310 are connected to the address information 18 via a corresponding bus line.

FIG. 9 shows the internal structure that is to be present at least in the OR/MUX switch subunits 310 in order to achieve a circuit design according to the invention. A logic unit 311 enables the relevant data bits to be OR-ed together, and a $2^k$:1 multiplexer 312 enables the selection of a data bit. One of these subunit elements 311 and 312 are present in each subunit 310; in the complete OR/MUX switch 300, the number of subunit elements equals the data-bus width of a data bus 210. The functionality of the subunit elements 311 and 312 and of a 2:1 multiplexer 313 connected to their outputs is well known, so that there is no need to explain them.

The selection of which connection is actually used is made via the additional information bit in the address information 18. The aim, according to the sequence defined in the previously unpublished German patent application DE 10 2004 007 232.9, is to use the multiplexer to compute a new state in the initial passes in order to use the different RAM basic blocks for different tables. In the final pass, however, the OR operation is required.

The additional information bit must be computed by the unit rCBS1 (1) from the counter reading (12).

6) CITATIONS

[1] Rolf Hoffmann, Klaus-Peter Völkmann, Wolfgang Heenes: "Globaler Zellularautomat (GCA): Ein neues massivparalleles Berechnungsmodell" ["Global cellular automaton (GCA): a new massively parallel computing model"], Mitteilungen—Gesellschaft für Informatik e.V., Parallel-Algorithmen und Rechnerstrukturen, ISSN 0177-0454 No. 18, 2001, pages 21-28; http://www.ra.informatik.tu-darmstadt.de/publikationen/publik.html

[2] R. K. Brayton et al.: "Logic Minimization Algorithms for VLSI Synthesis", Kluwer Academic Publishers, USA 1984, in particular pages 1 to 14, 54 to 88 and 139 to 147

[3] Mike Trapp: "PLD-design methods migrate existing designs to high-capacity devices", EDN Access, February 1994; http://www.reed-electronics.com/ednmag/archives/1994/021794/04d f1.htm

[4] Wolfgang Heenes, Rolf Hoffmann, Klaus-Peter Völkmann: "Architekturen für den globalen Zellularautomaten" ["Architectures for global cellular automata"], 19th PARS Workshop, Mar. 19-21, 2003 Base1; http://www.ra.informatik.tu-darmstadt.de/publikationen/pars03.pdf

[5] WO 2004/040766 A2

[6] U.S. Pat. No. 4,870,302 A

[7] W. Oberschelp/G. Vossen: "Rechneraufbau und Rechnerstrukturen", 8th Edition, 2000, Verlag Oldenburg (DE)/ISBN 3-486-25340-9

The invention claimed is:

1. A computer having a reconfigurable architecture containing
   a RAM-based primary part (Ht) comprising
      a structurable RAM unit (2) comprising a plurality of RAM blocks (221),
      a first crossbar switch (1), where external input data (9) on the architecture is to be applied to its input, and whose output is connected to the input of the RAM unit (2) via a first bus system (20), and
      a second crossbar switch (3), whose input is connected to the output of the RAM unit (2) via a second bus system (21), and whose output is connected to the input of the first crossbar switch (1) via a third bus system (10) in order to feedback output-side data from the second crossbar switch (3) to the input of the first crossbar switch (1),
      where address signals (18 and 13) produced by the first crossbar switch (1) are to be input to the RAM unit (2) and the second crossbar switch (3) for addressing, and
      where the output-side data from the second crossbar switch (3), if necessary after further processing, is also to be input to an output network (8) for the output of output data (17) on the architecture, plus
   means in an additional control part (St) for sequential control of the primary part (Ht), comprising a counter unit (4), where a common clock signal (14) is to be input to the counter unit (4) and to the first crossbar switch (1), and where counter reading signals (12) produced by the counter unit (4) are to be input to the first and second crossbar switches (1 and 3).

2. The computer as claimed in claim 1, characterized in that the output-side data from the second crossbar switch (3) is initially to be input to a programmable Exclusive-Or logic unit (6)

3. The computer as claimed in claim 1, characterized in that the output-side data from the second crossbar switch (3) is to be input to a downstream register unit (7) whose output is connected to the output network (8) for the output of output data (7) on the architecture.

4. The computer as claimed in claim 2, characterized in that the counter unit (4) is assigned a configurable compare unit (5), which is to receive the common clock signal (14), where a clock signal (15) that comes from the compare unit (5) and controls the data transfer from the Exclusive-Or logic unit (6) is to be input to the register unit (7), and a reset signal (16) from the compare unit (5) is to be input to the counter unit (4).

5. The computer as claimed in claim 3, characterized in that state signals (11) from the register unit (7) are to be input to the first crossbar switch (1).

6. The computer as claimed in claim 1, characterized in that the RAM unit (2) contains RAM basic cells (220) that comprise the RAM blocks (221) combined by an OR/MUX switch (300).

7. The computer as claimed in claim 6, characterized in that address signals (18) from the first crossbar switch (1) are to be input to the OR/MUX switch (300).

8. The computer as claimed in claim 6, characterized in that RAM basic cells (220) are to be combined by means of address signals (13) from the first crossbar switch (1).

9. The computer as claimed in claim 1, characterized in that CAMs are provided as additional memory devices.

10. The computer as claimed in claim 1, characterized in that at least one GCA is integrated.

11. The computer as claimed in claim 1, characterized in that magnetoresistive components, in particular TMR type devices, are provided as storage elements.

12. The computer as claimed in claim 2, characterized in that the output-side data from the second crossbar switch (3) is to be input to a downstream register unit (7) whose output is connected to the output network (8) for the output of output data (7) on the architecture.

13. The computer as claimed in claim 3, characterized in that the counter unit (4) is assigned a configurable compare unit (5), which is to receive the common clock signal (14), where a clock signal (15) that comes from the compare unit (5) and controls the data transfer from the Exclusive-Or logic unit (6) is to be input to the register unit (7), and a reset signal (16) from the compare unit (5) is to be input to the counter unit (4).

14. The computer as claimed in claim 4, characterized in that state signals (11) from the register unit (7) are to be input to the first crossbar switch (1).

15. The computer as claimed in claim 7, characterized in that RAM basic cells (220) are to be combined by means of address signals (13) from the first crossbar switch (1).

16. The computer as claimed in claim 12, characterized in that the counter unit (4) is assigned a configurable compare unit (5), which is to receive the common clock signal (14), where a clock signal (15) that comes from the compare unit (5) and controls the data transfer from the Exclusive-Or logic unit (6) is to be input to the register unit (7), and a reset signal (16) from the compare unit (5) is to be input to the counter unit (4).

17. The computer as claimed in claim 13, characterized in that state signals (11) from the register unit (7) are to be input to the first crossbar switch (1).

* * * * *